United States Patent [19]

Iwasawa

[11] Patent Number: 4,649,453
[45] Date of Patent: Mar. 10, 1987

[54] CASSETTE TAPE PLAYER HAVING SEALING MEANS

[75] Inventor: Susumu Iwasawa, Ohmiya, Japan

[73] Assignee: Sony Corporation, Tokyo, Japan

[21] Appl. No.: 574,157

[22] Filed: Jan. 26, 1984

[30] Foreign Application Priority Data

Feb. 8, 1983 [JP] Japan .................. 58-17935[U]
Feb. 19, 1983 [JP] Japan .................. 58-23589[U]

[51] Int. Cl.⁴ ............... G11B 17/00; B65D 53/00
[52] U.S. Cl. ................... 360/137; 360/96.6; 206/387; 206/811; 220/378; 220/375
[58] Field of Search ........... 206/387, 811; 220/378, 220/375, 306; 360/134, 96.6, 90, 137

[56] References Cited

U.S. PATENT DOCUMENTS

| | | | |
|---|---|---|---|
| B 513,134 | 3/1976 | Yamamoto et al. | 150/52 R |
| 1,296,275 | 3/1919 | Firth | 220/378 |
| 2,031,363 | 2/1936 | Erikson | 220/378 |
| 3,058,612 | 10/1962 | Nagy, Jr. | 220/306 |
| 3,126,591 | 3/1964 | Hamilton | 220/378 |
| 3,145,872 | 8/1964 | Hayes | 220/375 |
| 3,782,584 | 1/1974 | Swenson et al. | 206/232 |
| 3,841,466 | 10/1974 | Hoffman et al. | 220/378 |
| 4,250,349 | 2/1981 | Bennett | 220/375 |
| 4,365,711 | 12/1982 | Long et al. | 220/306 |
| 4,418,830 | 12/1983 | Dzung et al. | 220/378 |
| 4,453,189 | 6/1984 | Ida | 360/90 |
| 4,464,694 | 8/1984 | Kondo | 360/137 |
| 4,465,189 | 8/1984 | Molzan | 206/811 |
| 4,593,331 | 6/1986 | Tomita | 360/93 |

FOREIGN PATENT DOCUMENTS 878194 1/1943 France .................. 220/378

OTHER PUBLICATIONS

"Best" sales catalog, 1982/1983 edition, pp. 356-359.

*Primary Examiner*—William Price
*Assistant Examiner*—Brenda J. Ehrhardt
*Attorney, Agent, or Firm*—Hill, Van Santen, Steadman & Simpson

[57] ABSTRACT

A cassette tape player has an exterior case comprising a first structural member containing a major part of an internal mechanism including a device for driving a cassette tape, a second structural member engaged with the first structural member so as to be able to have an opening and closing movement, an elastic seal member provided so as to be put between the first and second structural members to seal up the exterior case when the second structural member is closed to the first member, and additional elastic seal members for sealing up portions of control buttons, adjusting buttons, jacks and so forth provided on both or one of the first and second structural members. The elastic seal members act to make the exterior case waterproof and dustproof.

10 Claims, 10 Drawing Figures

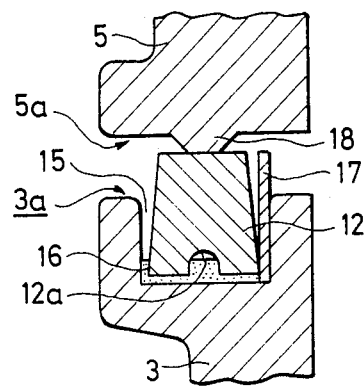
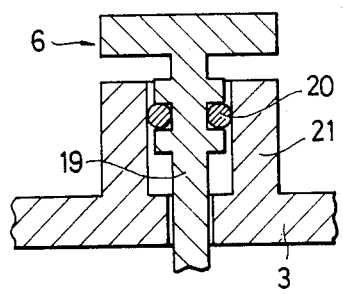
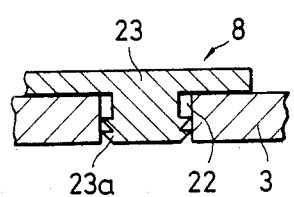
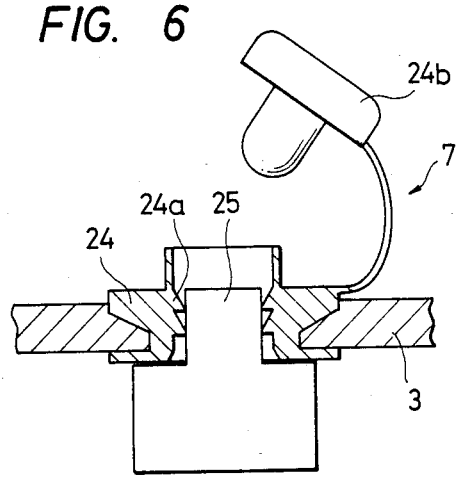

CASSETTE TAPE PLAYER HAVING SEALING MEANS

BACKGROUND OF THE INVENTION

This invention relates generally to cassette tape players miniaturized and lightened in weight so as to be handy to carry, and more particularly to a portable cassette tape player which has an exterior case capable of being maintained in a waterproof and dustproof condition and is controllable to make it perform a desired operation with the exterior case being in the waterproof and dustproof condition.

A cassette tape player which works with a usual compact cassette tape and has the dimensions of an exterior case miniaturized to be slightly larger than the external dimensions of a cassette of the compact cassette tape except in a thickness thereof, is often used outdoors as a portable apparatus. Such a cassette tape player as often used outdoors is frequently placed in a situation where water and dust can easily enter into the exterior case which can cause trouble and abnormal operations due to the water and dust which enters the exterior case. Accordingly, it is desired that a waterproof and dustproof exterior case be provided for a cassette tape player which is used outdoors, and in the case of the waterproof and dustproof exterior case, a control panel portion which is formed on the exterior case should be provided therein with control buttons which engage with an internal mechanism must be positively sealed.

OBJECTS AND SUMMARY OF THE INVENTION

It is an object of the present invention to provide a cassette tape player which is arranged for preventing effectively water and dust from entering into an exterior case thereof so that troubles and abnormal operations resulting from water and dust are avoided even if it is often used outdoors as a portable apparatus.

Another object of the present invention is to provide a cassette tape player having an improved exterior case which can be made waterproof and dustproof.

A further object of the present invention is to provide a cassette tape player having an improved exterior case which is able to be made waterproof and dustproof and has a control panel portion formed thereon and which can be positively sealed and which has control buttons for control so that an internal mechanism can be actuated from outside of the exterior case which is waterproof and dustproof.

According to an aspect of the present invention, there is provided a cassette tape player having an exterior case which comprises a first structural member containing a major portion of an internal mechanism including a driving device for a cassette tape, a second structural member engageable with the first structural member so as to provide an opening and closing movement, and an elastic seal member attached to at least one of the facing cut ends of the first and second structural members so that the elastic seal member is placed between the first and second structural members to seal the exterior case when the second structural member is closed to the first structural member. In the case where the exterior case is provided with adjusting buttons and jacks which are connected to the internal mechanism, additional elastic seal members may be attached so as to seal the adjusting buttons and the jacks.

One embodiment of a cassette tape player according to the present invention has an exterior case which comprises first and second structural members and an elastic seal member as mentioned above and further is provided with a control panel portion having openings formed at positions for control buttons, which are usable for controlling an internal mechanism from the outside of the exterior case which is waterproof and dustproof, and which lie in a flat plane of one of the first and second structural members and an elastic plate member which has control portions corresponding to the openings, respectively, and a flat portion extending to surround the control portions and is attached to the flat plane of one of the first and second structural members with a thermocompressible adhesive film which is between the flat portion of the elastic plate member and the flat plane.

In the cassette tape player thus constructed in accordance with the present invention, the exterior case which is divided into first and second structural members engage with each other so as to be able to have mutual opening and closing movement and can be sealed with the elastic seal member which is provided between the facing cut ends of the first and second structural members when the first and second structural members are closed, and further the openings provided at the positions of control buttons, jacks and so on in the first and second structural members are sealed up with additional elastic seal members as required. Accordingly, water and dust are effectively and positively excluded, and dew condensation caused in the inside of the exterior case due to temperature differences between the inside and the outside of the exterior case is avoided.

Further, the control panel portion formed on the exterior case which is provided with control buttons which are connected to the internal mechanism can be also sealed positively with a relatively simple configuration without spoiling the operation or the durability of the control buttons.

The above and other objects, features and advantages of the present invention will become apparent from the following detailed description thereof taken in conjunction with the accompanying drawings.

BRIEF DESCRIPTION OF THE DRAWINGS

FIG. 3 is a fragmental section of a portion of the embodiment shown in FIG. 1 used for explaining an elastic seal member and the environs thereof in the embodiment of FIG. 1;

FIGS. 4, 5 and 6 are sections of portions of the embodiment shown in FIG. 1, respectively, used for explaining sealing arrangements for a rotary adjustment button, an opening provided for a jack and an opening provided for a jack used to be connected with an external power source and for adjusting pressure in an exterior case in the embodiment of FIG. 1;

DESCRIPTION OF A PREFERRED EMBODIMENT

Figure 1:
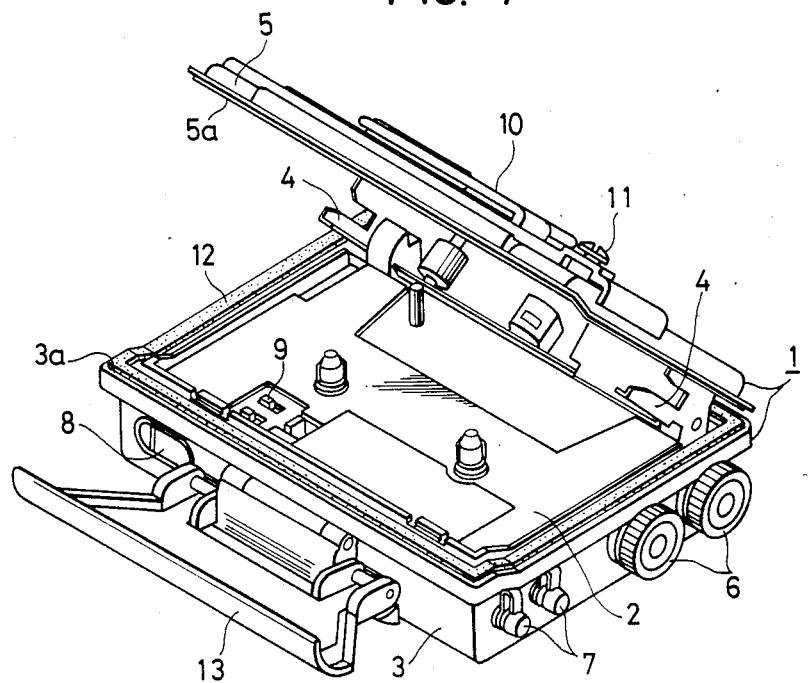
FIG. 1 is a perspective view showing one embodiment of cassette tape player according to the present invention.

FIG. 1 shows one example of a cassette tape player according to the present invention. This example has an exterior case 1 made of plastics. The exterior case 1 is divided into a body member 3 which contains a major part 2 of an internal mechanism including a driving device for driving a cassette tape, a device serving as a radio receiver and so on, and a lid member 5 which is provided with a cassette holder 4 and which engaged due to a hinge with the body member 3 so it can be opened and closed. A tape cassette (not shown) is loaded into and unloaded from the cassette holder 4 when the lid member 5 is open relative to the body member 3.

At the side wall of the body member 3, rotary adjustment buttons 6, jack portions 7 and an opening portion 8 for a jack which can be used wherein connected to an external power source and also for adjusting the internal pressure are provided. A hook member 10 which is used for hanging the cassette tape player to a belt or the like is detachably connected to the lid member 5 with a screw 11.

Figure 2:
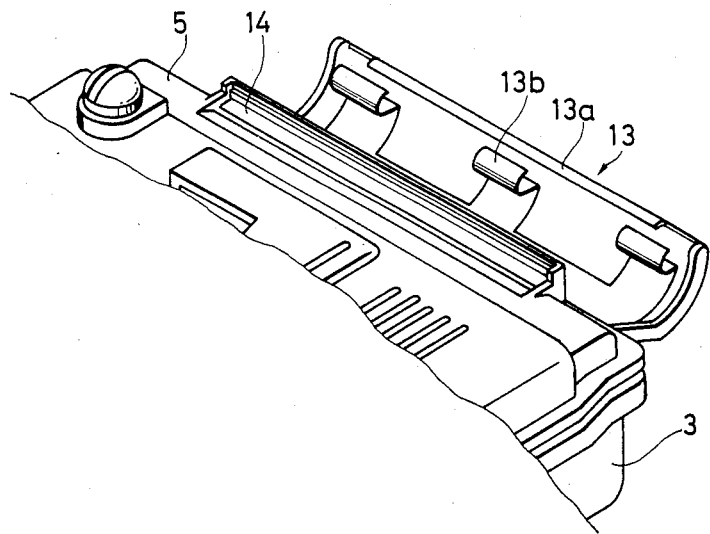
FIG. 2 is a fragmental perspective view of a portion of the embodiment shown in FIG. 1 used for explaining a binding member employed in the embodiment of FIG. 1.

The body member 3 and the lid member 5 have at their peripheral edges, respectively cut ends 3a and 5a which face each other when the lid member 5 is closed, and an elastic seal member 12 is attached to the cut end 3a of the body member 3 and makes a loop along the cut end 3a. This elastic seal member 12 is mounted between the cut end 3a of the body member 3 and the cut end 5a of the lid member 5 and comes into contact with the cut end 5a of the lid member 5 when the lid member 5 is closed. Further, a binding member 13 is attached to the side wall of the body member 3 and is used to press the lid member 5 against the body member 3 through the elastic seal member 12 mounted between the cut ends 3a and 5a when the lid member 5 is closed. As shown in FIG. 2, the binding member 13 comprises an exterior member 13a made of plastic and a contacting plate 13b made of metal which is provided at the inside of the exterior member 13a. The contacting plate 13b engages a receptacle 14 made of metal which is fixed to the lid member 5 when the binding member 13 is utilized. The end portion of the contacting plate 13b is formed with plate springs and the plate springs resiliently press down the receptacle 14 so that the lid member 5 and the body member 3 are tightly sealed. Since the receptacle 14 is made of metal, the lid member 5 is not injured by the contacting plate 13b.

The elastic seal member 12, which is made of flexible silicone rubber, for example, is placed in a groove 15 formed in the cut end 3a of the body member 3 and is fixed with a silicone rubber adhesive agent 16, as shown in FIG. 3. This elastic seal member 12 has a cutout groove 12a at its bottom so that it has appropriate stiffness in case of elastic deformation thereof. When the elastic seal member 12 is pressed by the cut end 5a of the lid member 5, the cutout groove 12a allows the elastic seal member 12 to be easily deformed which results in that the elastic seal member 12 has substantially reduced stiffness. Accordingly, it is possible to cause the elastic seal member 12 to have a suitable stiffness by selecting the dimensions of the cutout groove 12a.

On the other hand, a limiting plate 17 made of, for example, metal is provided in the groove 15 so as to prevent the elastic seal member 12 from being excessively squeezed. When the elastic seal member 12 is squeezed too much, an undesirable permanent deformation of the elastic seal member 12 will be caused. Accordingly, in this example, for the purpose of avoiding such an undesirable permanent deformation of the elastic seal member 12, the limiting plate 17 is provided at a position opposite to a portion of the cut end 5a of the lid member 5. The limiting plate 17 is operative to engage the cut end 5a of its lid member 5 and limit the movement when the cut end 5a of the lid member 5 is approaching too close to the cut end 3a of the body member 3, thereby to prevent the elastic seal member 12 from being excessively squeezed and to keep the elastic seal member 12 in a condition where suitable binding forces are uniformly distributed over the whole area. The cut end 5a of the lid member 5 has an projecting portion 18 which is elongated along the whole loop thereof to assure contact with the elastic seal member 12.

In a condition such that the projecting portion 18 formed on the cut end 5a of the lid member 5 and keeps in contact with the top surface of the elastic seal member 12 which is placed in the groove 15 formed at the cut end 3a of the body member 3, and the body member 3 and the lid member 5 are suitably sealed by the binding member 13 with the elastic seal member 12.

Although the elastic seal member 12 is attached to the cut end 3a of the body member 3 in this embodiment, it is possible to attach the elastic seal member 12 to the cut end 5a of the lid member 5. Further, although the lid member 5 is provided with the cassette holder 4, it is also possible to modify the exterior case so that a tape cassette is loaded into the body member 3 and the lid member 5 acts as a mere lid.

Hereafter, sealing arrangements for the portions provided with the rotary adjustment buttons 6, the jack portions 7 and the opening portion 8 for the jack used to be connected to the external power source and for adjusting internal pressure will be explained with reference to the respective examples shown in FIGS. 4, 5 and 6.

As shown in FIG. 4, the rotary adjustment button 6 has a shift 19 surrounded by a sealing ring member 20 made of rubber or the like which is inserted into a cylindrical boss 21 which projects from the body member 3. The sealing ring member 20 thus provided comes into tight contact with the inner surface of the cylindrical boss 21 so as to seal the inside of the cylindrical boss 21. The inner surface of the cylindrical boss 21 is greased to ensure the seal.

At the opening portion 8 for the jack which is used to connect to the external power source so as to adjust the internal pressure, an opening 22 is formed in the body member 3 and a rubber plug 23 is inserted into the opening 22, as shown in FIG. 5. The rubber plug 23 has flexible projections 23a formed into rings around its body. These flexible projections 23a of the rubber plug 23 come into contact with the inner surface of the opening 22 to seal it.

Further, at the jack portion 7, a rubber packing 24 having an opening which passes therethrough is mounted on the body member 3 and a waterproof jack 25 is inserted into the opening of the rubber packing 24, as shown in FIG. 6. The opening in the rubber packing 24 is provided on its inner surface with ring-shaped flexible projections 24a which come into contact with the outer surface of the waterproof jack 25 to seal the inside of the rubber packing 24. In this example, a rubber plug 24b is attached to the rubber packing 24 and is inserted into the opening of the rubber packing 24 when any plug, such as a headphone plug, is not present in the waterproof jack 25.

Figure 7:
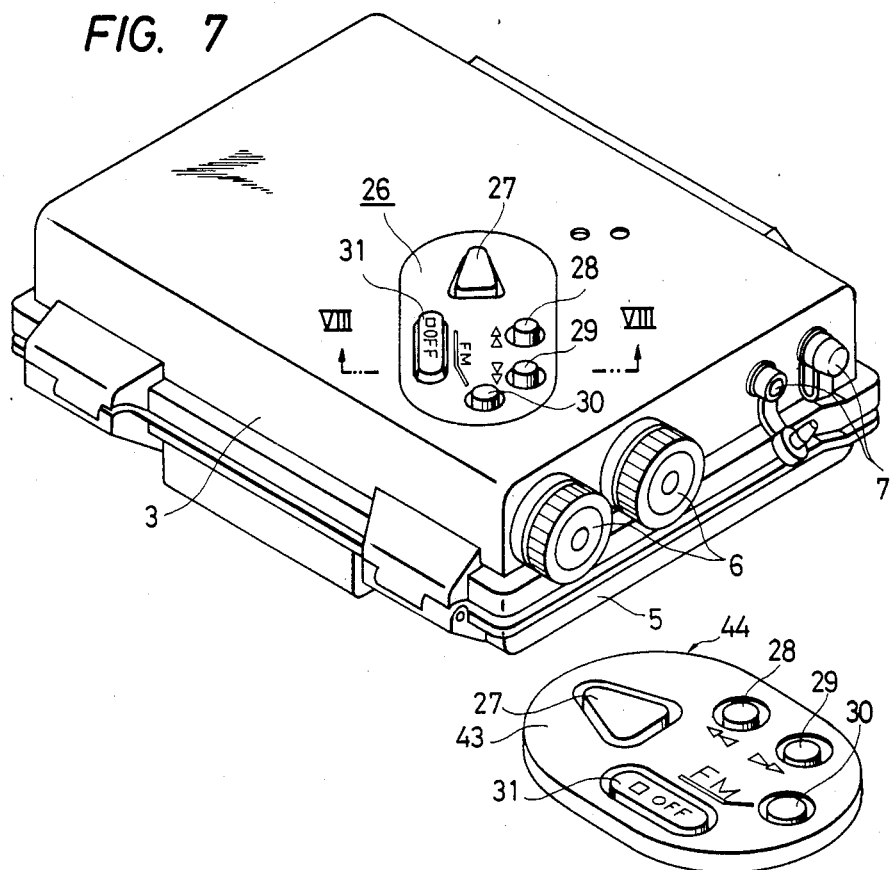
FIG. 7 is a perspective view showing the exterior of the embodiment shown in FIG. 1.

FIG. 7 shows one side of the exterior case formed by a flat plane portion of the body member 3, which is not visible in FIG. 1. The flat plane portion of the body member 3 is provided with a control panel 26 which has a forward button control portion 27, a fast-forward button control portion 28, a rewinding button control portion 29, a radio button control portion 30 and a stop button control portion 31 located at positions corresponding to a forward button (FWD button) used for causing an normal reproducing operation mode, a fast-forward button (FF button) used for causing a fast-forwarding operation mode, a rewinding button (REW button) used for causing a rewinding operation mode, a radio button used for causing the device to operate as a radio receiver and a stop button used for releasing each of the above mentioned buttons from their operating states, respectively. In this example, each of five buttons aforementioned is formed as a push button. When one of the FWD button, FF button, REW button and radio button is pushed down through the corresponding one of the forward button control portion 27, the fast-forward button control portion 28, the rewinding button control portion 29 and the radio button control portion 30, it is kept in the pushed down state to cause the respective operation mode or condition, and when the stop button is pushed down with the stop button control portion 31, the operation mode or condition caused by pushing down the selected one of the FWD button, FF button, REW button and radio button is released.

Figure 8:
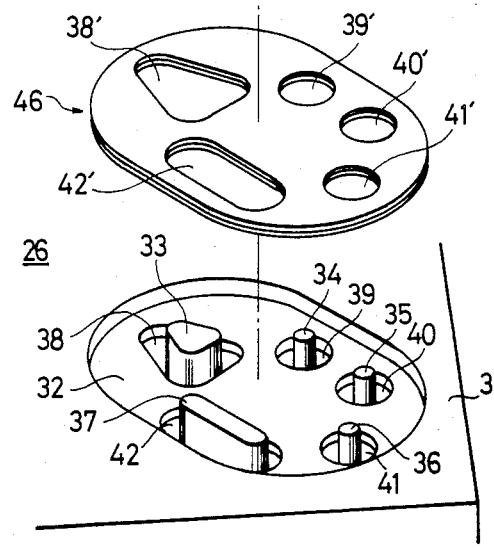
FIG. 8 is an exploded view in perspective of a control panel portion provided in the embodiment of FIG. 1 as shown in FIG. 7.
Figure 9:
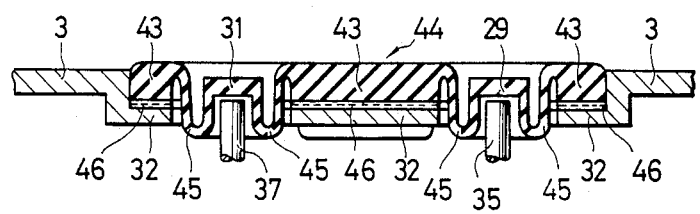
FIG. 9 is a section taken on line VIII—VIII in FIG. 7.

The control panel 26 is constituted as shown in FIG. 8 which shows an exploded view in perspective of the control panel 26 and in FIG. 9 which shows a sectional view on line VIII—VIII in FIG. 7. As shown in these figures, openings 38, 39, 40, 41 and 42 are formed at the positions corresponding to the FWD button 33, FF button 34, REW button 35, radio button 36 and stop button 37, respectively, in a flat depression 32 provided on the flat plate portion of the body member 3, and the top ends of the FWD button 33, FF button 34, REW button 35, radio button 36 and stop button 37 are projected toward the outside through the openings 38, 39, 40, 41 and 42, respectively.

Besides, an elastic plate member 44 which is obtained by forming the forward button control portion 27, fast-forward button control portion 28, rewinding button control portion 29, radio button control portion 30 and stop button control portion 31 in a body together with a flat portion 43 extending to surround each control portion, and has its contour coincident with the contour of the flat depression 32, is provided. This elastic plate member 44 is made of, for example, a mixture of acrylonitrile-butadiene rubber (NBR) and polyvinyl chloride (PVC). The forward button control portion 27, fast-forward button control portion 28, rewinding button control portion 29, radio button control portion 30 and stop button control portion 31 are arranged to have positions corresponding to the openings 38, 39, 40, 41 and 42 formed in the flat depression 32, respectively, and each of these control portions 27, 28, 29, 30 and 31 is held by a flexibly bent portion 45 which is elongated from the flat portion 43 so that they can be easily pushed down and then put back in place by an elastic force of the flexibly bent portion 45. Each of the control portions 27, 28, 29, 30 and 31 has its top surface arranged to be slightly lower than the upper surface of the flat portion 43 so that they cannot be accidentally puched down. The upper surface of the flat portion 43 and some of the top surfaces of the control portions 27, 28, 29, 30 and 31, for example, the top surface of the stop button control portion 31 are provided with indications (deltas, "FM", "OFF") which identify the respective buttons.

Figure 10:
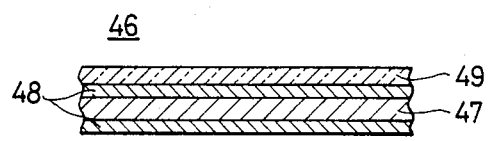
FIG. 10 is a fragmental section of a thermocompressible adhesive film used in the embodiment of FIG. 1.

Furthermore, a thermocompressible adhesive film 46 provided with openings 38', 39', 40', 41' and 42' corresponding to the openings 38, 39, 40, 41 and 42 is formed in the flat depression 32, respectively, and has its contour coincident with the contour of the flat depression 32. This thermocompressible adhesive film 46 comprises, for example, a thin polyethylene sheet 47 having both sides covered by layers 48 of NBR adhesive agent and a layer 49 of styrene-butadiene rubber (SBR) adhesive agent which covers one of the layers 48 of the NBR adhesive agent, as shown in FIG. 10.

The thermocompressible adhesive film 46 is put between the upper surface of the flat depression 32 and the under surface of the flat portion 43 of the electric plate member 44 in such a manner that the layer 48 of NBR adhesive agent comes into contact with the flat depression 32 and the layer 49 of SBR adhesive agent comes into contact with the flat portion 43 of the elastic plate member 44, and the flat portion 43 of the elastic plate member 44 is bonded to the flat depression 32 by heating and pressure (for example, heating to 120 degrees centigrade and a pressure of 3 to 3.5 $Kg/cm^2$), so that the elastic plate member 44 is attached to the body member 3. So as to cause the elastic plate member 44 to be attached securely, it is preferable to cause halogen gas to act on the elastic plate member 44 in order to extract oil from the same or to sandblast the under surface of the flat portion 43 of the elastic plate member 44, before the elastic plate member 44 is attached to the body member 3. When the elastic plate member 44 is attached to the body member 3, the forward button control portion 27, fast-forward button control portion 28, rewinding button control portion 29, radio button control portion 30 and stop button control portion 31 of the elastic plate member 44 are positioned to cover, respectively, the top ends of the FWD button 33, FF button 34, REW button 35, radio button 36 and stop button 37 which project, respectively, respectively through the openings 38, 39, 40, 41 and 42 formed in the flat depression 32.

In such a manner as described above, the elastic plate member 44 is attached to the body member 3 having the openings 38, 39, 40, 41 and 42 at the positions corresponding to the FWD button 33, FF button 34, REW button 35, radio button 36 and stop button 37, respectively, so that the FWD button 33, FF button 34, REW button 35, radio button 36 and stop button 37 can be controlled through the respective control portions 27, 28, 29, 30 and 31 provided on the elastic plate member 44, at the control panel 26. In the control panel 26 thus constituted, the openings 38, 39, 40, 41 and 42 formed in the flat depression 32 of the body member 3 are covered by the respective control portions 27, 28, 29, 30 and 31 with the flexible bent portions 45 therearound of the elastic plate member 44 which is bonded to the flat depression 32 with the thermocompressible adhesive film 46. In that case, since the thermocompressible adhesive film 46 is securely bonded to the upper surface of the flat depression 32 with the layer 48 of NBR adhesive agent and the under surface of the flat portion 43 of the elastic plate member 44 is securely bonded to the thermocompressible adhesive film 46 with the layer 49 of SBR adhesive agent, and also since the layer 48 of NBR adhesive agent is highly waterproof, the control panel 26 is sufficiently sealed to prevent water and dust from entering into the body member 3.

Although the illustrative embodiment of the present invention has been described in detail herein with reference to the FIGS. 1 to 10, it is to be understood that the shape of an exterior case of a cassette tape player according to the present invention is not limited thereto, and various changes and modifications may be effected therein. Further, it is also to be understood that a cassette tape player according to the present invention may be able to perform not only reproducing operation but also recording operation, and also it is not necessary that a cassette tape player according to the present invention have a radio receiver.

What is claimed is:

1. A cassette tape player having an exterior case which comprises a first structural member containing a major part of an internal mechanism including, a driving device for driving a cassette tape and having a first cut end at the peripheral edge thereof, a second structural member engageable with said first structural member and having an opening and closing movement therewith and having a second cut end at the peripheral edge thereof, said second cut end engaging said first cut end when said second structural member is closed to said first member, and an elastic seal member mounted in a groove which is provided in at least one of said first and second cut ends so as to be placed between said first and second structural members to seal the exterior case, and a limiting member provided between said elastic seal member and the inside of said groove and mounted so as to prevent said elastic seal member from being excessively deformed between said first and second structural members when said second member is closed with said first structural member.

2. A cassette tape player according to claim 1, wherein said elastic member has a thickness greater than the depth of said groove.

3. A cassette tape player according to claim 1, wherein said elastic seal member is provided with a cutout groove at the bottom portion which is in contact with the bottom of said groove.

4. A cassette tape player according to claim 1, wherein said elastic seal member is held in said groove formed in one of said first and second cut ends and the other of said first and second cut ends provided with a projecting portion which elongated along the whole length.

5. A cassette tape player according to claim 1, wherein said elastic seal member is made of silicone rubber.

6. A cassette tape player according to claim 1, wherein said exterior case is provided with a control panel portion comprising, a flat plane portion of one of said first and second structural members having therein at least one opening formed at a position corresponding to control means such as a button which is to be used for controlling thereby the internal mechanism from the outside of the exterior case, an elastic plate member having at least one control portion arranged to be placed at a position corresponding to said opening, and a flat portion extending and surrounding said control portion, said control portion and said flat portion being formed into a body, and a thermocompressible adhesive film provided between said flat plane portion and said elastic plate member for bonding said flat portion of the elastic plate member to said flat plane portion of one of said first and second structural members.

7. A cassette tape player according to claim 6, wherein said thermocompressible adhesive film is provided with a layer of acrylonitrile-butadiene rubber adhesive agent on the side facing said flat plane portion of said one of said first and second structural members.

8. A cassette tape player according to claim 6, wherein said thermocompressible adhesive film is provided with a layer of styrene-butadiene rubber adhesvie agent on said side facing said flat portion of the elastic plate member.

9. A cassette tape player according to claim 1, wherein said exterior case further comprises an additional elastic seal member provided in a supporting portion formed on one of said first and second structural members and having an opening in which a portion of a rotary adjustment button is inserted so as to seal said opening, and mounted between the inner surface of said opening and said portion of the rotary adjustment button, and said inner surface of said opening is lubricated to ensure that a seal exists.

10. A cassette tape player according to claim 1, wherein said exterior case further comprises an additional elastic seal member for sealing up an opening provided at a position corresponding to a jack connected with the internal mechanism and into which a headphone plug or a power source plug from the outside of said exterior case is connected, and for adjusting the internal pressure in said exterior case.

* * * * *